(12) United States Patent
Hesse et al.

(10) Patent No.: US 6,914,772 B2
(45) Date of Patent: Jul. 5, 2005

(54) VIDEO CONFERENCE SYSTEM ENCLOSURE

(75) Inventors: Thomas H. Hesse, Mesa, AZ (US); Keith A. Weaver, El Mirage, AZ (US)

(73) Assignee: Multimedia Telesys, Inc., Tempe, AZ (US)

( * ) Notice: Subject to any disclaimer, the term of this patent is extended or adjusted under 35 U.S.C. 154(b) by 213 days.

(21) Appl. No.: 10/462,898

(22) Filed: Jun. 16, 2003

(65) Prior Publication Data

US 2004/0252447 A1 Dec. 16, 2004

(51) Int. Cl.⁷ .................................................. G06F 1/16
(52) U.S. Cl. ...................... 361/679; 361/680; 361/683; 312/242; 312/223.2; D14/99.28
(58) Field of Search .......................... 361/679, 681–686, 361/801–814; 312/242, 245, 7.2, 313, 223.2, 211, 223.3, 215; 52/36.2, 79.1, 27.5; 345/330, 905; 105/50.02; 348/14.01–14.16, 15, 383; 349/90.01, 93.24, 100.01; 379/93.24; D14/99.28, 130, 140, 146, 149; D20/1–6, 10; 235/379, 380, 381, 382, 482

(56) References Cited

U.S. PATENT DOCUMENTS

| | | | | |
|---|---|---|---|---|
| 2,413,922 A | * | 1/1947 | Jensen et al. ............... 348/827 |
| 2,438,256 A | * | 3/1948 | Stein .......................... 348/787 |
| 5,027,198 A | * | 6/1991 | Yoshioka ................. 348/14.08 |
| 5,142,562 A | * | 8/1992 | Guichard et al. ........ 348/14.01 |
| D342,517 S | * | 12/1993 | Bosson ...................... D14/133 |
| 5,382,972 A | * | 1/1995 | Kannes ................... 348/14.07 |
| 5,393,964 A | * | 2/1995 | Hamilton et al. .......... 235/381 |
| D395,129 S | * | 6/1998 | Johnson ...................... D99/28 |
| 5,774,663 A | * | 6/1998 | Randle et al. .............. 709/204 |
| 6,205,716 B1 | * | 3/2001 | Peltz .......................... 52/36.2 |
| 6,549,229 B1 | * | 4/2003 | Kirby et al. ............. 348/14.01 |
| 6,667,759 B2 | * | 12/2003 | Gerszberg et al. ....... 348/14.01 |
| 6,688,518 B1 | * | 2/2004 | Valencia et al. ............ 235/379 |
| 6,704,039 B2 | * | 3/2004 | Pena ........................ 348/14.01 |
| 6,755,491 B2 | * | 6/2004 | McElheney ................. 312/242 |
| 2002/0124271 A1 | * | 9/2002 | Hermann et al. ........... 725/151 |

* cited by examiner

Primary Examiner—Michael Datskovskiy
(74) Attorney, Agent, or Firm—Schmeiser, Olsen & Watts LLP

(57) ABSTRACT

An enclosure for a video conference system is disclosed. The enclosure includes a substructure that includes a pair of side structure beams. The side structure beams comprising a top section, a bottom section and a vertical support section connected together. The substructure further includes front structural panel connected to each of the pair of side structures and at least one back brace coupling the pair of side panels. A covering comprising a first side portion, a second side portion, a top portion, a bottom portion, and a front portion is attached over the substructure.

25 Claims, 13 Drawing Sheets

VIDEO CONFERENCE SYSTEM ENCLOSURE

TECHNICAL FIELD OF THE INVENTION

This invention relates to the field of video conferencing systems and, more particularly to an improved video conference system enclosure.

BACKGROUND OF THE INVENTION

There is often a need to provide secure communication between people. One example is the communication between a prisoner and a visitor such as the prisoner's attorney or relative. Traditionally, these interactions have occurred in person with the participants divided by a barrier such as glass in an area secured by guards. However, in person visitations have several drawbacks. First, there is always the potential that in person communications can lead to the transfer of contraband. This can, of course, lead to further problems in the prison. Second, monitoring in person communications is time consuming and labor intensive. Guards must be ever vigilant to stop the passing of contraband, such as weapons or drugs, between the participants to the conversation. This leads to additional expenses. Third, there are times when the participants to the conversation are unable to meet in person. For example, the participants may be geographically separated making it difficult or impossible to have in person conversations. This is especially true with the recent move to privatize prisons. This has resulted in prisoners serving their sentences in different states from where they were sentenced. Thus, relatives, lawyers and others may not be able to communicate with the prisoner.

These drawbacks have lead to the development of different ways to allow for remote communications between individuals. One way to provide the communication is by the use of a video conference system. In a typical video conference systems each party is provided with a camera, a microphone, a speaker and a video screen. The first party's images and speech are transmitted to the screen and speaker of the second party, and vice versa. In this manner the conversations can occur with the participants located anywhere.

The challenge in providing a video conference system for use by inmates is providing a video conference system that cannot be easily damaged by the user. The components of the video conference system must be enclosed in a secure enclosure. This is especially true in the case of a video conference system for use by inmates in a prison. The enclosures must be able to withstand physical abuse by an upset and violent inmate. Also, the enclosure must be designed to be difficult to disassemble by an inmate, in order to prevent an inmate from tampering with or damaging the equipment inside. The enclosure also must be free of sharp edges with which a prisoner could injure themselves or others. The enclosure also needs to be impervious to bodily fluids, which might be poured, thrown, or otherwise introduced onto the enclosure. Such fluids could cause a short circuit of electronics inside. Additionally, present enclosures are difficult to assemble and typically require an assembly team to install the units. What is needed is a video conference system enclosure that is able to withstand physical abuse and is easy to assemble with a few number of pieces.

SUMMARY OF THE INVENTION

A video conference system enclosure according to various aspects of the present invention includes an assembly substructure that provides for the attachment of panels to complete the enclosure with a minimal amount of exposed assembly hardware. The assembled enclosure is free from sharp edges and able to withstand a great deal of physical abuse. The components of the enclosure fit together tightly to prevent introduction of liquids, intentional or otherwise.

The video conference system enclosure includes a slopping top surface and a slopping surface by the viewing area. The slopping surfaces prevent the accumulation of liquids. Also, any objects placed, thrown, deposited or otherwise left on the slopped surfaces will fall off.

The video conference system encloses a monitor and a camera to facilitate video conferencing. The monitor is mounted on a holder such that it can be adjusted within the enclosure. A telephone handset or similar device is provided to allow voice communication.

The enclosure also may be combined with other enclosures to provide multiple locations for communications. When combined together optional privacy panels may be installed. The privacy panels may include an opening for cables and the like to pass through.

BRIEF DESCRIPTION OF THE DRAWINGS

Embodiments of the present invention will now be further described with reference to the drawings, wherein like designations denote like elements, and.

DETAILED DESCRIPTION OF THE PREFERRED EMBODIMENT

Figure 1:
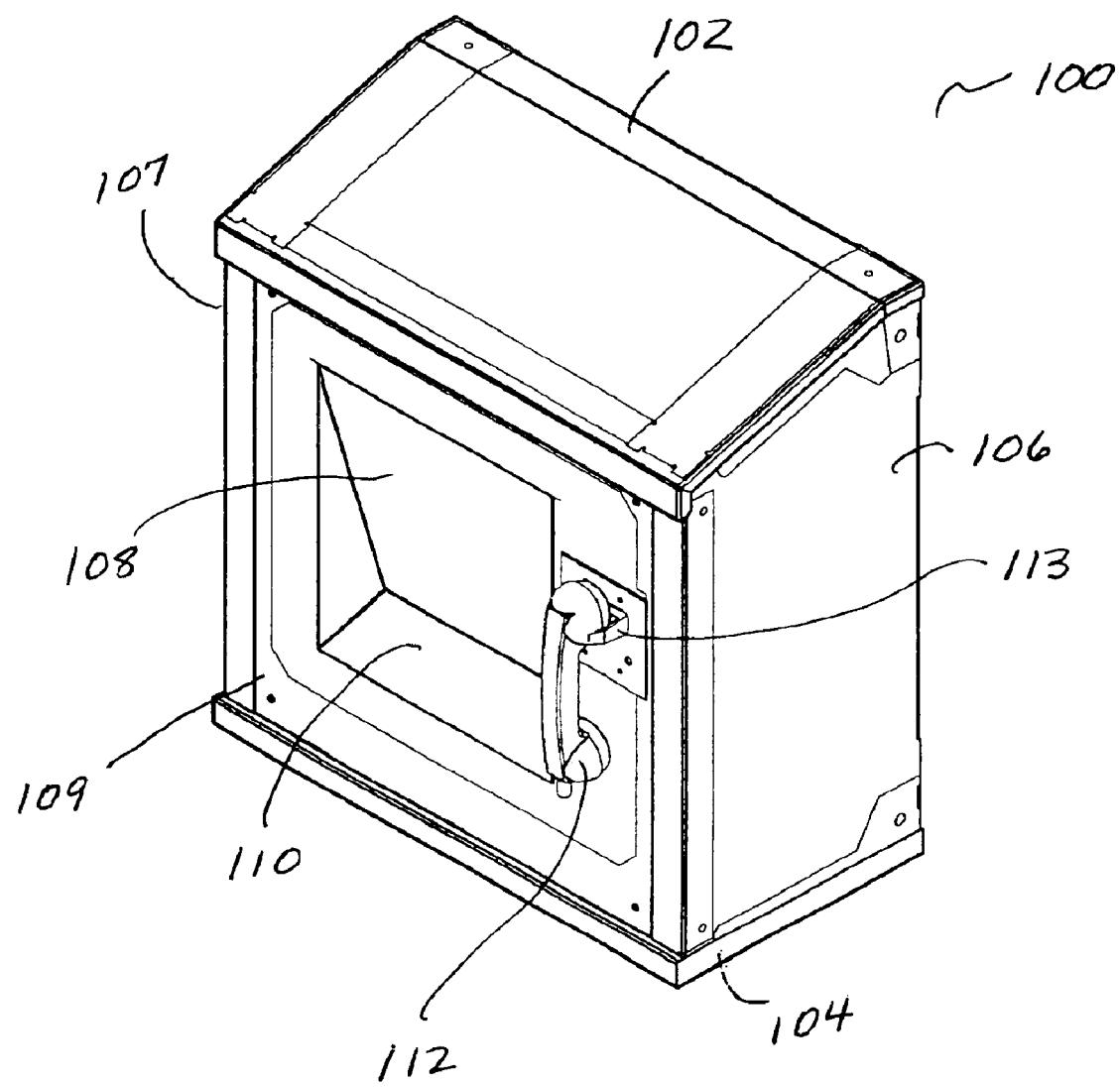
FIG. 1 is a perspective view of a video conference system enclosure according to various aspects of the present invention.

A video conference system enclosure according to various aspects of the present invention encloses video conference system equipment such as a monitor and a video camera. The enclosure also includes a telephone handset for audio communication. The enclosure generally is mounted to a wall although it can be mounted on a pole or similar structure for use away from a wall.

The enclosure includes a substructure having two "C" shaped side beams that provide structural strength for the enclosure. The enclosure can be easily disassembled and reassembled at a remote location with a minimum of tools. Metal panels are fitted over the substructure to provide a strong, moisture resistant barrier. The metal panels install with a minimum of exposed hardware making it difficult for a user to disassemble and ensuring the integrity of the unit.

For example, video conference system enclosure 100 of FIGS. 1–11 includes a top portion 102, a bottom portion 104, a first side section 106, a second side section 107, a transparent panel 108, mounted on a transparent panel bracket 110, a front panel 109 and a telephone handset 112 mounted on a telephone hook 113 (the telephone cord is not shown for clarity reasons but would normally be provided as part of the telephone handset, except in the case where the handset is a wireless device). Top portion 102, bottom portion 104, first side section 106, second side section 107 and front panel 109 form the covering that is installed over a substructure 602, the details of which are discussed in detail in conjunction with FIG. 6–11. Top portion 102, bottom portion 104, first side section 106, second side section 107 and front panel 109 are preferably made of a strong, impact resistant material. In one exemplary embodiment the material is stainless steel. In one embodiment, the complete enclosure is twenty-four inches wide, twelve inches deep, twenty-six inches tall at the tallest part (from the back of the top of the enclosure to the bottom of the enclosure) and twenty-three inches tall at the shortest point (from the front of the top of the enclosure to the bottom of the enclosure). Of course, the size and material makeup of the enclosure can vary depending on such factors as the size and amount of equipment needed to be stored and the space available to mount the enclosures.

Figure 2:
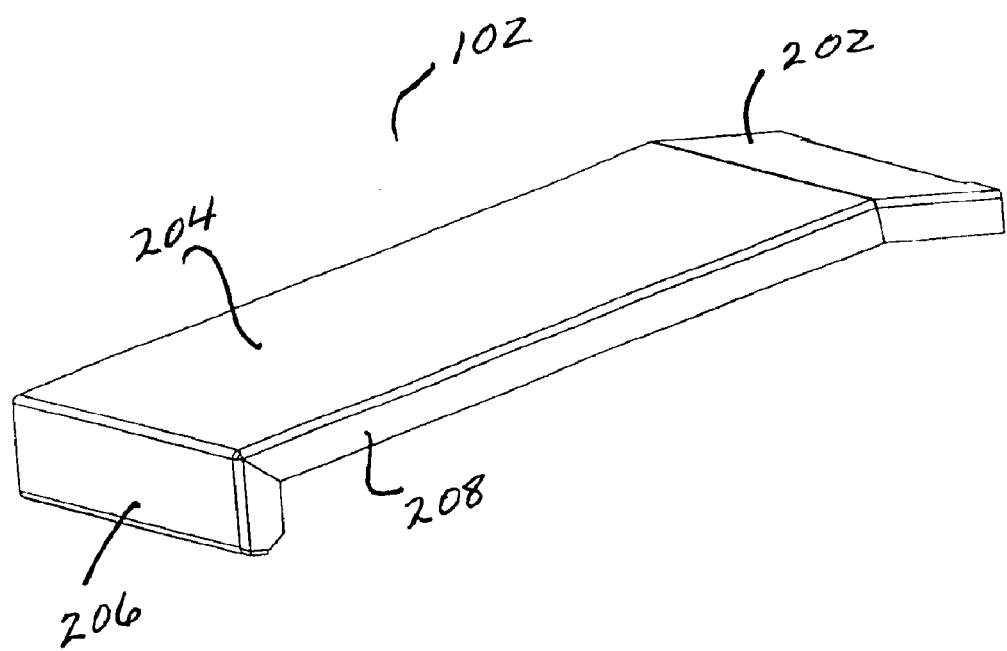
FIG. 2 is a view of the top portion of the video conference system.

Top portion 102 covers the top of enclosure 100. Referring to FIG. 2, in one embodiment, top portion 102, includes a flat section 202 at the back of enclosure 100, a sloping section 204 and a front section 206 and two side sections 208. Sloping section 204 slopes downward to cause any item placed on the sloping section 204 to roll off and fall to the ground. This prevents a user from attempting to hide or store any items, such as contraband on top of enclosure 100. Sloping section 204 also prevents liquids from accumulating on the top of the enclosure 100. The angle of the downward sloping can be any angle that is sufficient to overcome the frictional force holding the liquid or other materials in place. In one embodiment the angle is approximately sixteen degrees, although other angles can be used as long as they cause items placed on the surface to fall off. Flat section 202 is a narrow flat section located at the back of the enclosure and adjacent to the wall upon installation. Flat section 202 is flat so that a hole can be punched in the flat section to allow cables to be fed into the unit, typically through conduit, which would be attached to the hole. Cables can also be fed through the back and sides of the unit. In an alternative embodiment, both flat section 202 and sloping section 204 can be a sloping section. Side sections 208 and front section 206 fit over the sides and top of the enclosure.

Figure 3:
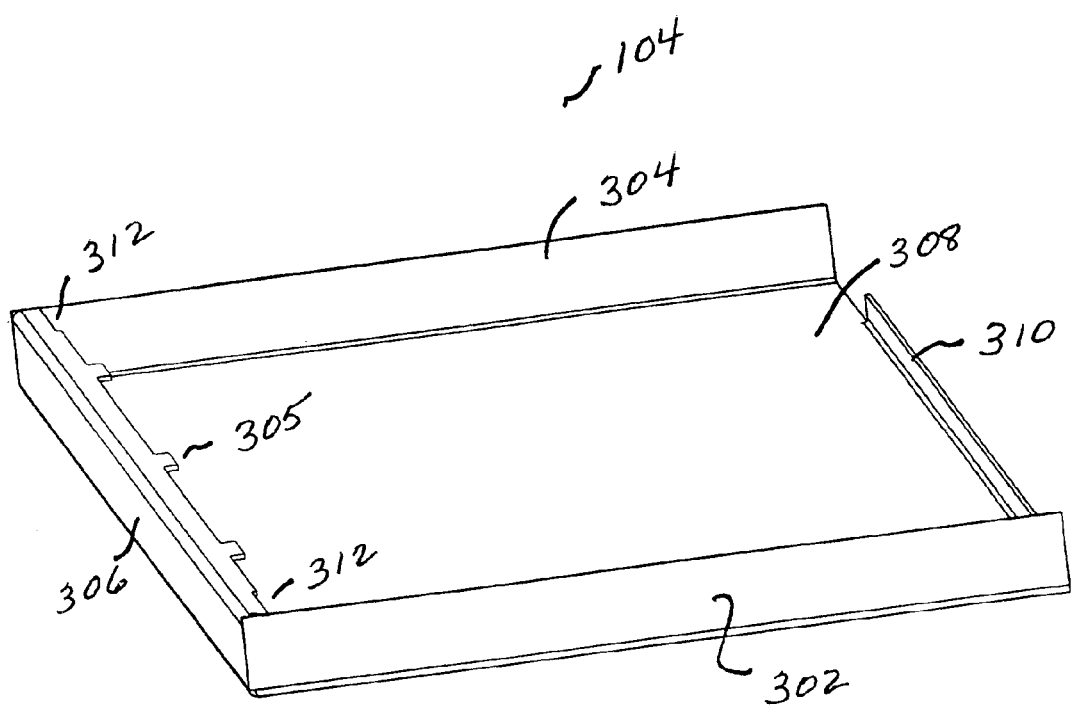
FIG. 3 is a view of the bottom portion of the video conference system.

Bottom portion 104 covers the bottom of the enclosure 100. Referring to FIG. 3, bottom portion 104 includes a bottom section 303, first bottom side section 302, second bottom side section 304, a bottom front section 306, having a plurality of tabs 305 and a notch 312 on either side, a bottom portion 104 and a bottom back section 310. First bottom side section 302 and section bottom side section 304 are formed at essentially a ninety degree angle to bottom section 303. The first bottom side section 302 and second bottom side section 304 will both cover a part of first side section 106 and second side section 107 when bottom portion 104 is installed. Bottom front section 306 is formed at essentially a ninety-degree angle to bottom section 303. A series of tabs 305 are formed on bottom front section 306 to secure bottom front section 306 to enclosure 100. This is described in further detail below. Notch sections 312 are designed to receive and hold part of first side section 106 and second side section 107. Bottom back section 310 covers a small part of the back of enclosure 100.

Figure 4:
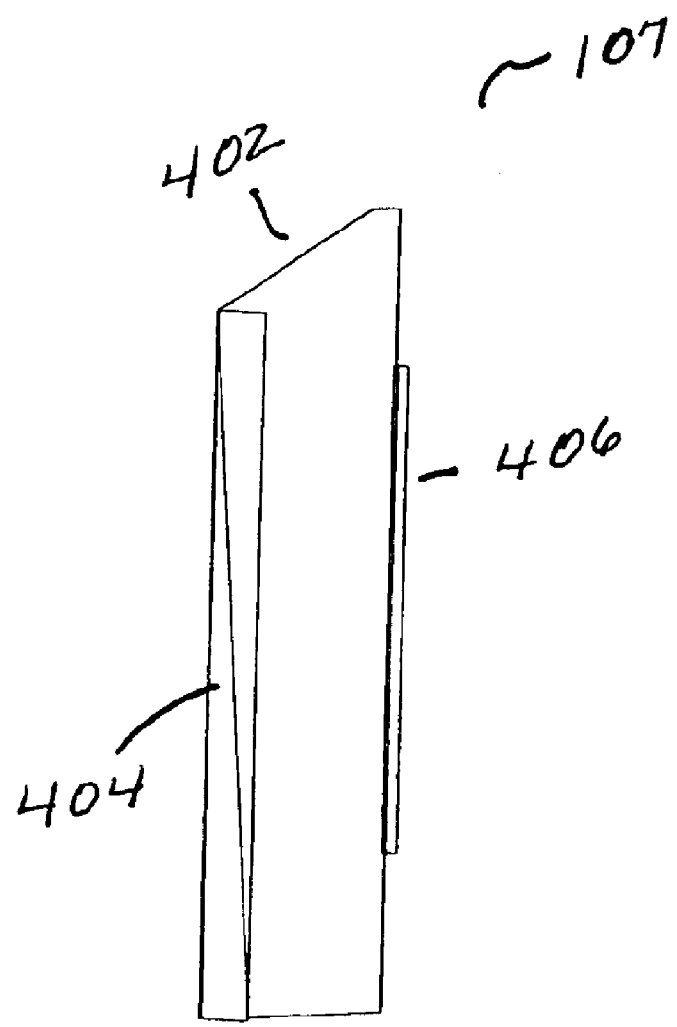
FIG. 4 is a view of the side section of the video conference system.
Figure 5:
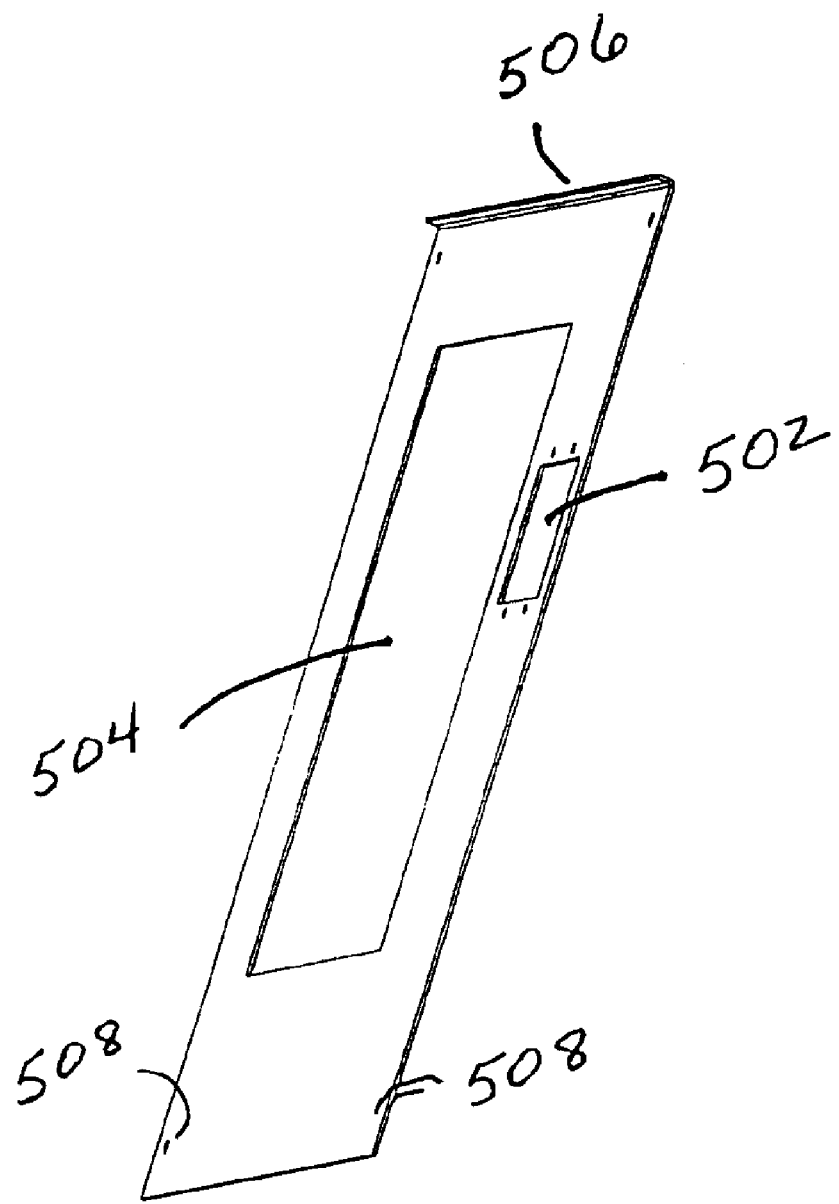
FIG. 5 is a view of the front section of the video conference system.

First side section 106 and second side section 107 are identical except one is for use on the right hand side of enclosure 100 and the other on the left hand side of enclosure 100. FIG. 4 shows second side section 107. Second side section 107 includes a side panel 402, a front section 404 and a back section 406. Side panel 402 covers the side of the enclosure 100. Front side section 106 covers a part of the front of the enclosure 100 and fits into notch 312 of bottom portion 104. This helps to secure first and second side sections 106 and 107. Back section 406 helps to hold structures on the back of the enclosure 100 and helps to retain first and second side sections 106 and 107 in place with friction.

Front panel 109 is for covering up the front of the enclosure. Front panel 109 includes a lens opening 504, a telephone receiver opening 502, and a lip 506. Lens opening 504 is for allowing the transparent panel 108 and transparent panel bracket 110 to be mounted and viewed. Telephone receiver opening 502 accepts the other components that make up the telephone handset 112. Lip 506 is used to help install front panel 109.

Transparent panel 108 is any transparent material that a user can look through to view the monitor and through which that the video camera can acquire an image of the user. In one embodiment, the transparent panel is made of LEXAN, an impact resistant plastic developed by General Electric Corporation, although any other clear impact resistant materials can be used. In one embodiment, LEXAN is mounted onto transparent panel bracket 110 at an angle. The angle at which the transparent panel 108 is mounted is chosen such that a user attempting to punch the transparent panel 108 will have most of the force of the blow dissipated. In one embodiment the angle that the transparent panel is mounted is 16.5 degrees, although other angles can also be used. A thin scratch resistant layer (not pictured) can be incorporated with transparent panel 108. The thin scratch resistant layer can be a soft plastic layer. The purpose of the thin plastic layer is to allow the thin plastic layer to get scratched since it is cheaper and easier to replace. When mounted on the enclosure, the plastic layer and LEXAN panel from an air and liquid tight barrier. This protects the enclosure from liquid intrusion. The transparent panel bracket 110 has an angled surface. The angled surface is angled downward towards the ground to prevent the accumulation of liquids on the transparent panel as well as keeping objects placed thereon from staying there.

Telephone handset 112 is, in one embodiment, a conventional telephone handset that provides for the transmission and reception of voice signals when removed from the telephone hook 113. In one embodiment, telephone handset 112 is directly wired to a second specific enclosure and, therefore, audio communication can only occur with that terminal. In another embodiment, a keypad or similar device could be provided that allows the user to "dial" a specific enclosure from a list of enclosures. While a telephone handset is shown in FIG. 1, other means of providing audio communications can be provided including an intercom type push to talk button or similar device.

Figure 6:
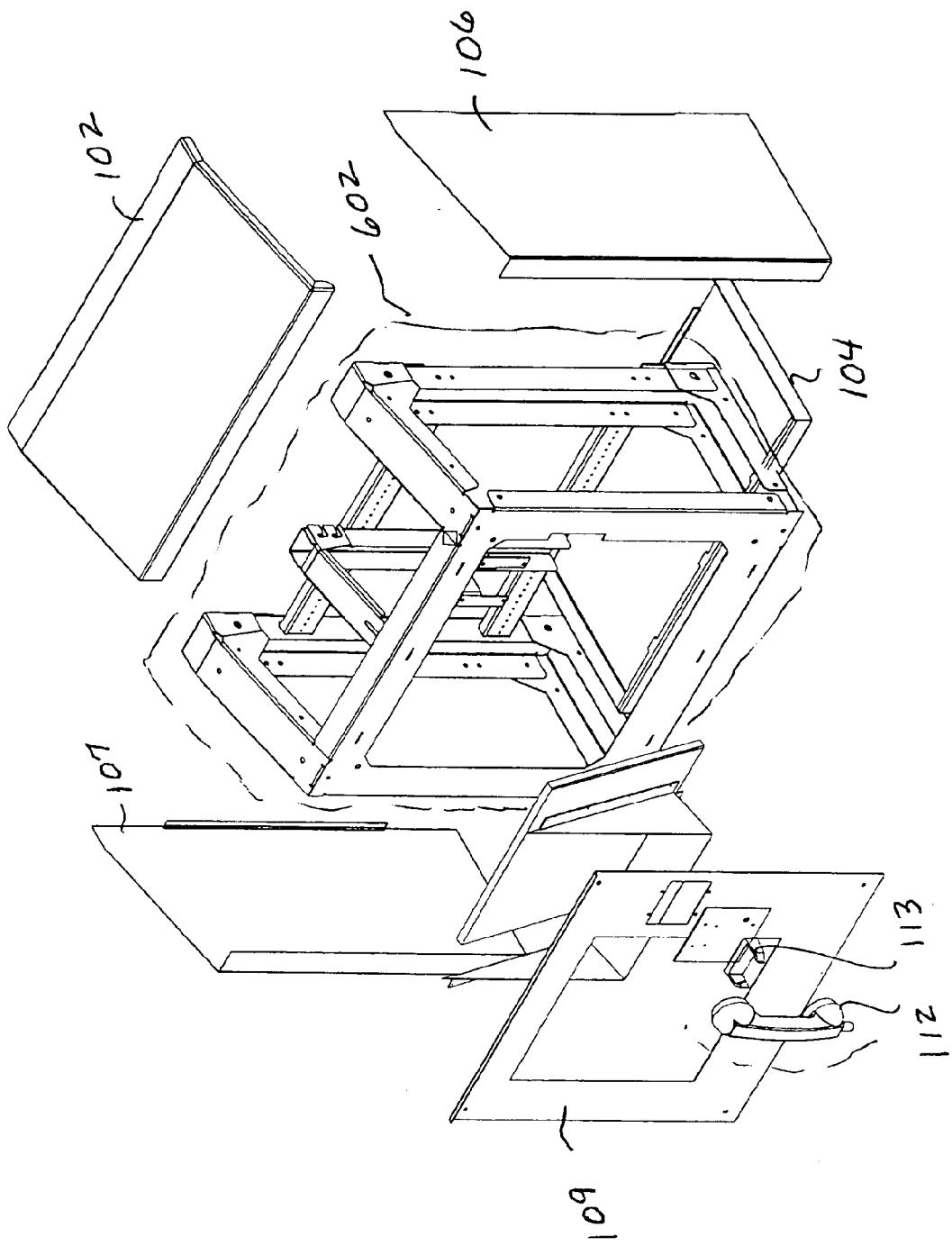
FIG. 6 is a view of a video conference system enclosure with the top, bottom and side panels removed.

Top portion 102, bottom portion 104, first side section 106, second side section 107, and front panel 109 are mounted on a substructure 602, as best seen in the exploded view of FIG. 6. Top portion 102, bottom portion 104, first side section 106, second side section 107 and front panel 109 are designed to mount to a substructure 602 with as little exposed hardware as possible. This significantly decreases the chance that a user could break into the enclosure 100 and damage or pilfer the equipment inside. Also, the top portion 102, bottom portion 104, first side section 106, second side section 107 and front panel 109 are designed to a tight tolerance that the pieces fastening to the substructure 602 leaving no gaps or sharp edges. The tight tolerance allows for the enclosure 100 to be moisture resistant.

Figure 7:
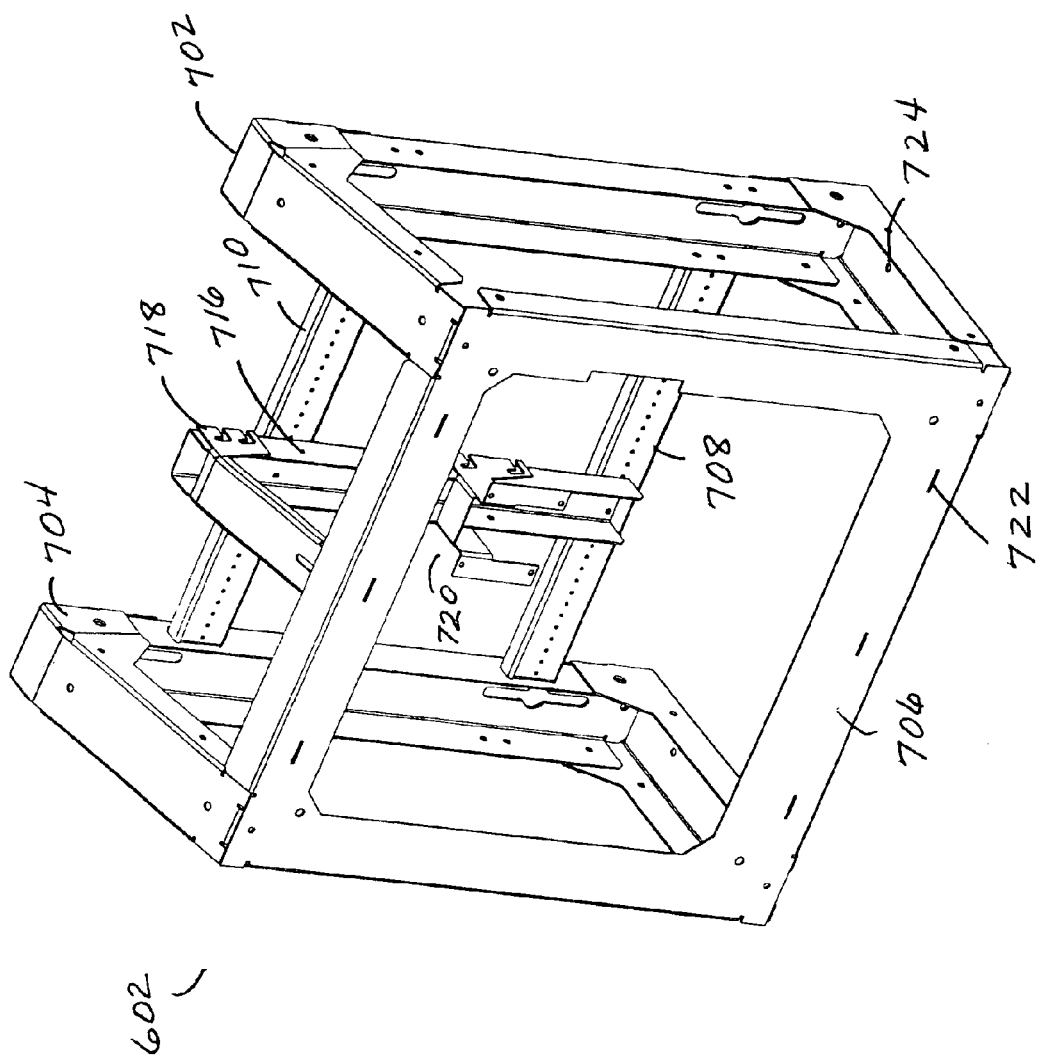
FIG. 7 is view of the substructure of the video conference system enclosure.

Substructure 602, as best seen in FIGS. 6–7, includes a right side structure 702 and a left side structure 704 connected by a first back brace 708 and a second back brace 710. A front substructure panel 706 is coupled to the right and left side structures 702 and 704. The parts of the substructure 602 can be connected with ordinary fasteners since the fasteners will be covered by the outer structure and not accessible to a user of the enclosure. Substructure 602, like the outer structure, is preferably made of a strong material such as steel. Of course, other like materials can also be used without departing from the scope of the present invention.

Figure 8:
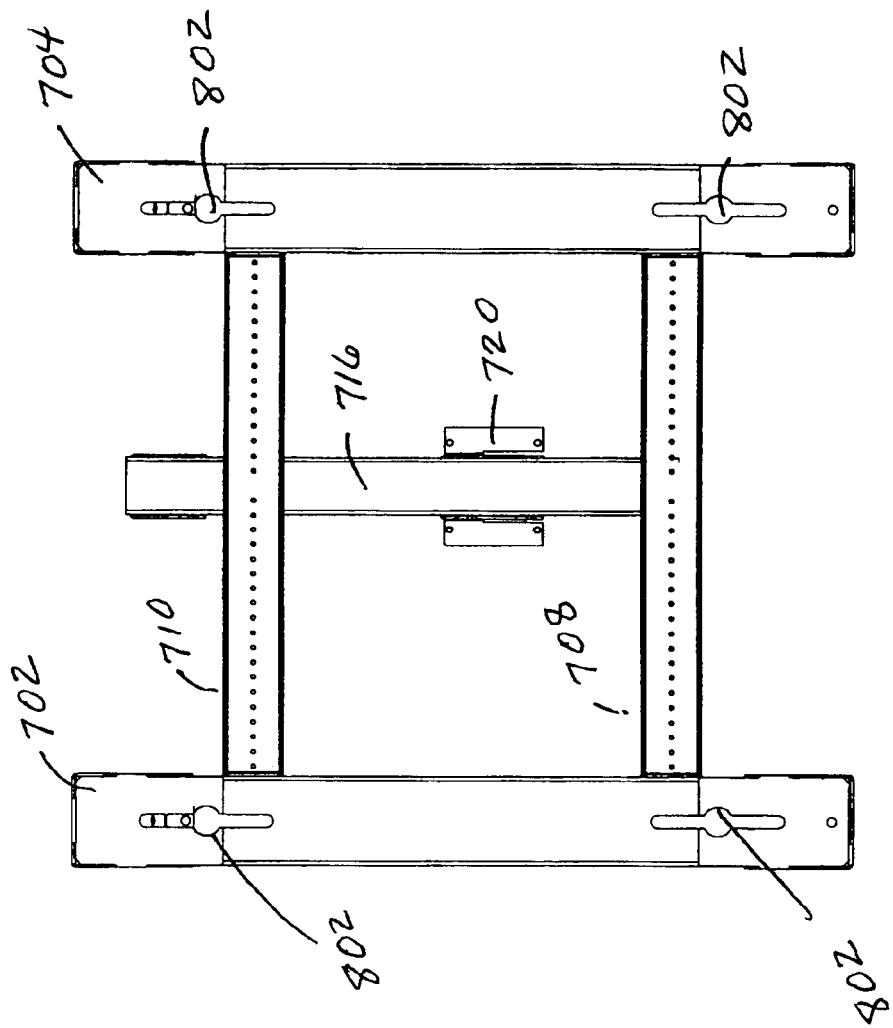
FIG. 8 is a view of the back of the substructure of the video conference system enclosure.

The back of substructure 602, as best seen in FIG. 8, includes a plurality of mounting holes 802 formed on right and left side structures 702 and 704. Each of the mounting holes 802 are designed to receive a wall stud 902 that, in one embodiment, has been previously installed into a wall 904. Prior to mounting substructure 602, the wall studs 902 are placed in proper places in the wall 904. The placements of the wall studs 902 can be accomplished by measuring the locations for the wall stud using the substructure 602 as a guide or by using a template, which indicates where on the wall the wall studs are to be mounted.

Figure 9:
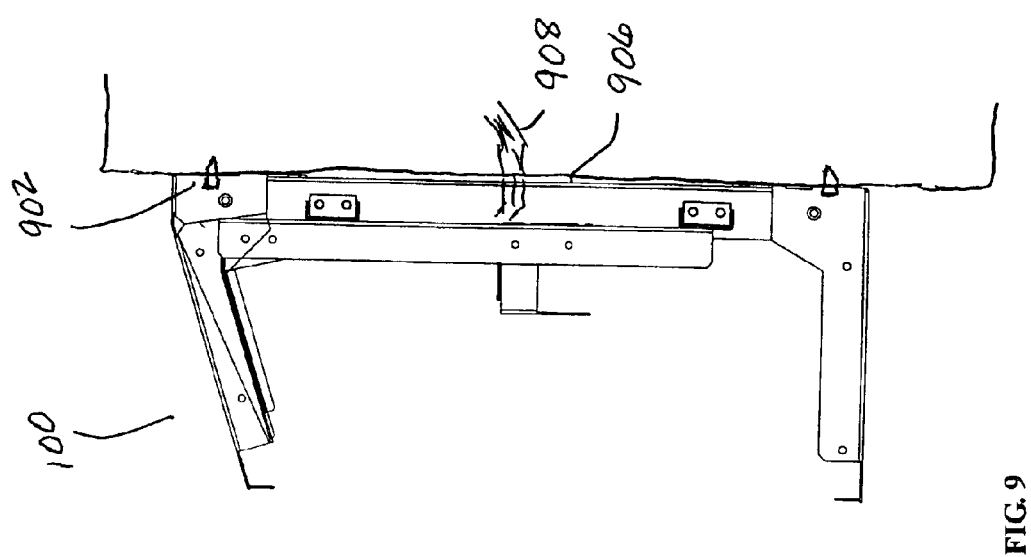
FIG. 9 is a side view of part of the substructure mounted on to a wall.

As seen in FIG. 9, when the substructure 602 is mounted on the wall 904, there is a space 906 between the wall and the right and left side structures 702 and 704. In FIG. 9 only the right side structure 702 is shown for simplicity. It is into this space 906 that, in one exemplary embodiment, a back section 406 (illustrated in FIG. 4) of first side section 106 and second side section 107 is inserted when assembling video conference system enclosure 100. By inserting the back section 406 into space 906 first and second side sections 106 and 107 are installed flush on the substructure 602. A series of cables 908 for power and networking of the cameras and monitors, in one embodiment, are fed through the wall 604 and out an opening in the wall 604 into video conference system enclosure 100. Cables 908 may also be fed in through the top portion 102 of enclosure 100. First and second back braces 708 and 709 are oriented such that they do not extend as far as the right and left side structures 702 and 704 to prevent the first and second back braces 708 and 709 from contacting anything on the wall and making mounting of the enclosure 100 difficult.

Front substructure panel 706 mounts on to each of the right and left side structures 702 and 704. As discussed previously, front substructure panel 706 has a plurality of slots 722 for accepting the tabs 305 of bottom portion 104. First and second back braces 708 and 710 couple to right and left side structure 702 and 704 via bolts and nuts that can be passed through opening 1002 of first and second back braces 708 and 710 to openings 1102 in right and left side structure 702 and 704 where it can be secured by a nut or similar structure. Of course, the screw, bolt or other fastening device can be started at opening 1102 and passed through opening 1002 when fastening device is secured.

Mounted to first back brace and second back brace 708 and 710 is an accessory brace 716. Accessory brace 716 is affixed to first back brace 708 and second back brace 710 via a fastening device such as a nut and bolt that affixes the accessory brace 716 to one or more accessory position openings 1004 on first back brace and second back brace 708 and 710. Numerous accessory position openings 1004 are formed along first back brace 708 and second back brace 710. This allows for the mounting of accessory brace 716 in different locations in the vertical direction. This allows different size monitors to be used with the vertical adjustment helping to keep the monitor visible through transparent panel 108.

Figure 10:
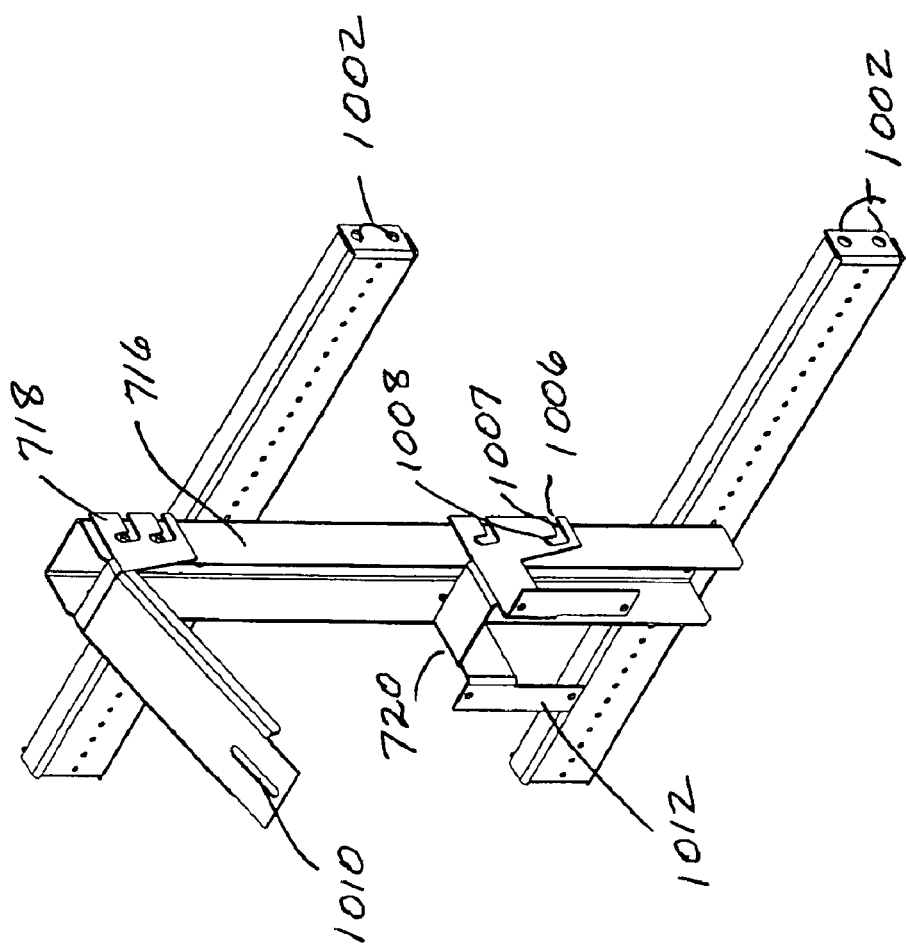
FIG. 10 is a view of the accessory brace with a video camera mount and a monitor mount'

Referring to FIG. 10, mounted onto accessory brace 716 is a camera mount 718 and a monitor mount 720. Camera mount 718 includes a slot 1010 for securing a video camera. Monitor mount 720 includes a mounting bracket 1012 for installing a monitor. In one embodiment, the monitor is a flat panel display such as a LCD, plasma or digital light projection screen.

In one embodiment monitor mount 720 and camera mount 718 attach to pegs (not pictured) on accessory brace 312 using an "L" shaped opening 1006. "L" shaped opening 1006 has a first section 1007 that is generally straight and a second section 1008 that is also generally straight. First section 1007 and second section 1008 intersect each other, typically making an angle greater than ninety degrees (an obtuse angle), although any angle can be used. The first section 1007 receives a peg that is further mounted on accessory brace 716. At the end of first section 1007, the "L" shaped brace transitions to second section 1008 and moves downward until the peg engages the end of second section 1008. The "L" shaped opening 1006 allows a secure yet easily removable mount for the camera and the monitor.

Figure 11:
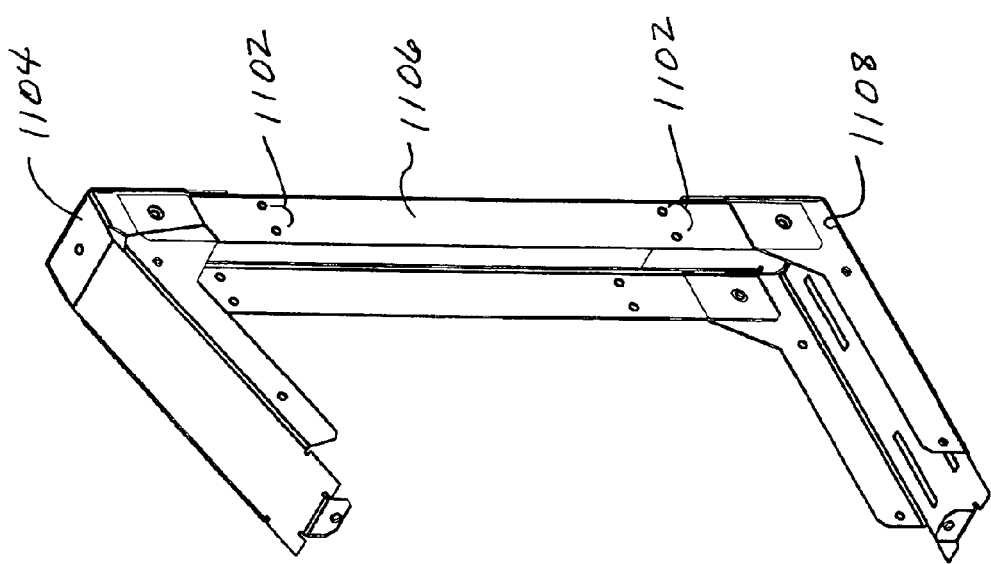
FIG. 11 is a view of one of the side structures that supports the substructure

Referring to FIG. 11, right and left side structures 702 and 704 comprises a top beam 1104, a bottom beam 1108 and a vertical beam 1106 connecting the bottom beam 1108 and the top beam 1104. Top beam 1104 has a straight portion and then angles downward to accommodate the shape of top portion 102. Straight beam 1106 and bottom beam 1108 are essentially straight along at least one side. In one embodiment, top beam 1104, straight beam 1106 and bottom beam 1108 are welded together to form a "C" shaped support beam. Right and left side structures 702 and 704 as discussed previously are mounted to the wall and other parts of substructure 602 are attached to right and left side structure 702 and 704. Thus, the right and left side structures 702 and 704 support both the substructure 602 and the outer covering of the enclosures. The right and left side structures 702 and 704 form a strong support for the assembly of the substructure 602.

In one embodiment, the installation of the outer structure is as follows. Bottom portion 104 has tabs 305 which are inserted into slots 702 of front substructure panel 706 of substructure 602. Threaded studs (not pictured) are welded to the inside of the bottom portion 104. When bottom portion 104 is installed, the threaded studs will pass through an opening 724 of right side substructure 702 and left side substructure 704 where they are secured by a nut or similar device. First and second side sections 106 and 107 are then installed by inserting the side sections into a space formed between the substructure 602 and the bottom portion 104. First and second side sections include front section 404 and back section 406. Front section 404 and back section 406 install around the front and back of substructure 602. When the top portion 102 is placed on top of substructure 602, the side section 208 of the top portion 102 will overlap the first and second side sections 106 and 107. The tight fit of the bottom portion 104 and the side section 208 of the top portion 102 holds first and second side sections 106 and 107 in place. Top portion 102 also has threaded studs (not pictured) welded inside that, when the top portion 102 is installed in place over substructure 602, are secured with a nut or similar device.

After installing the top portion 102, front panel 109 is installed. The lip 506 of front panel 109 engages a slight overlap (not visible in the drawing) formed between front section 206 of the top portion 102 and substructure 602 when top portion 102 is installed. The front panel 109 is inserted at an angle such that the lip 506 catches the overlap of the top portion 102. After catching the overlap the front panel 109 is then rotated downward and is secured to front substructure panel 706 of substructure 602 by tamper proof screws. In one embodiment four tamper proof screws are inserted through screw openings 508 in front panel 109.

The above description provided an exemplary way of attaching the covering pieces (top portion 102, bottom portion 104, first side section 106, second side section 107 and front panel 109) to the outer panels over substructure 602. Variations to the above description can be made without departing from the scope of the present invention. Variations to the method for applying the outer panels should entail the minimization of exposed hardware to form a secure, tamper proof enclosure.

Figure 12:
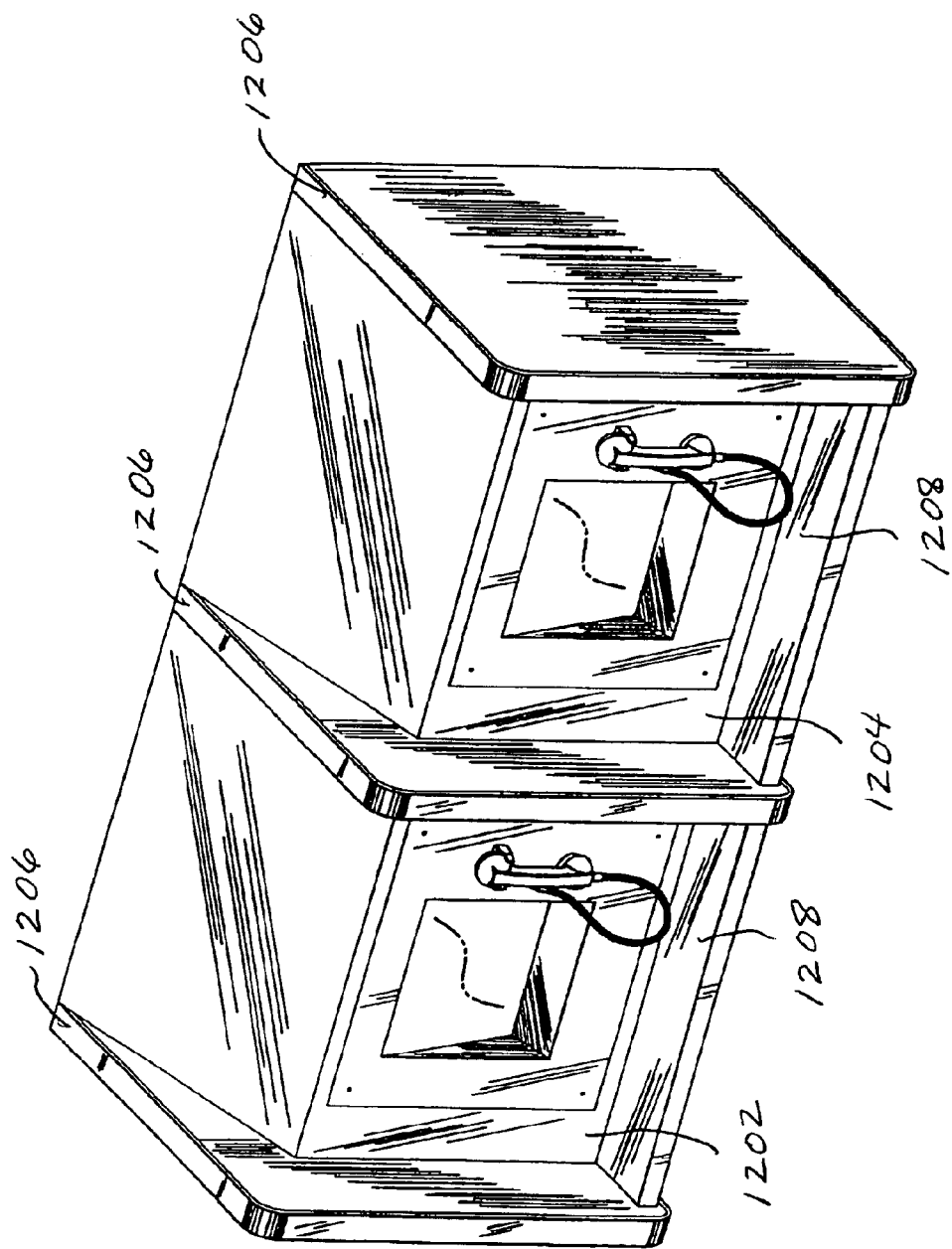
FIG. 12 is an embodiment illustrating multiple enclosures combined together.

In FIGS. 1–11 a single wall mounted unit embodiment of the present invention is illustrated. Multiple enclosures of the present invention can be combined together to provide a series of video conference booths. For example, referring to FIG. 12, a first video conference system enclosure 1202 and a second video conference system enclosure 1204 are shown connected. While two enclosures are shown in FIG. 12, additional booths can be connected. In the illustration of FIG. 12, first and second side sections 106 and 107 are replaced with privacy panels 1206. Privacy panels 1206 help to block conversations occurring at one enclosure from reaching another enclosure. While privacy panels are used in FIG. 12, in other embodiments first and second side sections 106 and 107 can be modified for used between enclosures. In one embodiment, the first and second side sections 106 and 107 are modified by having an opening cut out to allow for the passage of cables and wirings.

Also, an optional tray 1208 may be provided between privacy panels. Tray 1208 is designed to have a downward angle such that any item placed on the tray 1208 would fall off the tray 1208. In one embodiment, privacy panels 1206 extend from the first video conference system enclosure 1202 and second video conference system enclosure 1204 to the ground. The privacy panels 1206 between first video conference system enclosure 1202 and second video conference system enclosure 1204 may have an opening (not pictured) to route cables through. In this manner, all the cables can first enter an enclosure and then be passed to others through openings in the privacy panel 1206. Obviously, the privacy panels 1206 at the end of a series of enclosures would be solid.

Figure 13:
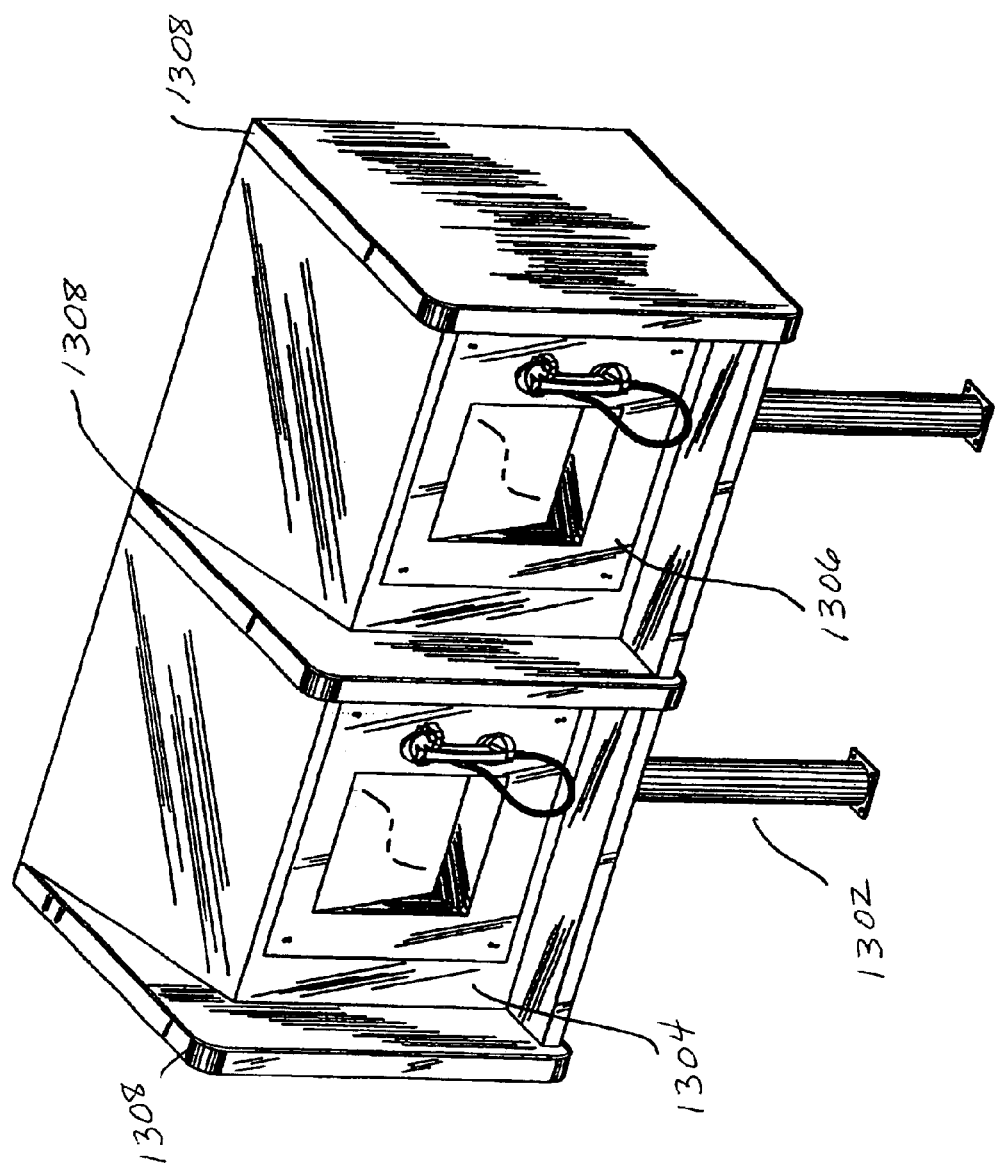
FIG. 13 is an alternative embodiment illustrating multiple enclosures joined together.

Instead of mounting on a wall, video conference system enclosure is mounted on a pole 1302 as seen in FIG. 13. In this embodiment, a back panel (not pictured) would be attached to first enclosure 1304 and second enclosure 1306. In this embodiment, the enclosures 1304 can be mounted on a pole 1302 or similar structure anywhere in a room. In the embodiment shown in FIG. 13, the enclosures 1304 can be combined together to form a row of video conference system enclosures. Also, first and second enclosures 1304 and 1306 may include privacy panels 1308. The privacy panels 1308 may cover just the enclosure or extend from the top of enclosure to the floor. While the embodiment of FIG. 13 shows multiple enclosures side by side, the enclosures can also be place back to back. Alternatively, the enclosures can be placed back to back and side to side. A room of enclosures can be provided having a plurality of wall mounted enclosures along the walls and a plurality of pole mounted enclosures away from the wall.

While the embodiments discussed involved in video conferencing in prison applications, the video conference system enclosure of the present invention can be used in any application where a heavy duty impact resistant enclosure is needed. This includes video conferencing and video phone application in public places such as bus terminals and airports.

Having now described preferred embodiments of the invention modifications and variations may occur to those skilled in the art. The invention is thus not limited to the preferred embodiments, but is instead set forth in the following clauses and legal equivalents thereof.

What is claimed:

1. An enclosure for a video conference system comprising:
   a substructure including:
      a pair of side structure beams having a front side and a back side;
      a front structural panel connected to the front side of each of the pair of side structure beams;
      at least one back brace connected to the back side of each of the pair of side structure beams; and
      a covering comprising a first side portion, a second side portion, a top portion, a bottom portion, and a front portion attached over the substructure.

2. The enclosure of claim 1 wherein a camera mount and monitor mount are attached to a vertical support secured to the at least one back brace.

3. The enclosure of claim 2 wherein the vertical support is adjustable along the at least one back brace to provide adjustment of the monitor.

4. The enclosure of claim 1 further comprising a transparent screen mounted on the front portion at an angle which prevents a blow from damaging the transparent screen.

5. The enclosure of claim 1 further comprising a telephone handset for verbal communications.

6. The enclosure of claim 1 wherein two or more enclosures are coupled together.

7. The enclosure of claim 6 wherein the two or more enclosures are separated by a privacy panel.

8. The enclosure of claim 7 wherein the privacy panel extends from the top of the enclosure to the floor.

9. The enclosure of claim 1 wherein the enclosure is mounted on a wall.

10. The enclosure of claim 1 wherein the bottom portion couples to the front structural panel via a series of slots on the bottom portion that engages a series of openings on the front structural panel and by a series of threaded bolts on the inside of the bottom portion that secures to the substructure.

11. The enclosure of claim 10 wherein the first side portion and the second side portion are inserted onto each of the pair of side structural beams and between the substructure and the bottom portion.

12. The enclosure of claim 11 wherein the top portion is secured on the top of the substructure using threaded bolts mounted to the inside of the top portion.

13. The enclosure of claim 12 wherein the first portion is secured to the front structure panel using a plurality of security fasteners.

14. A video conference booth having a supportive substructure, the video conference booth comprising:
   a bottom portion connecting to a bottom portion of the substructure without external hardware;
   a top portion connecting to a top portion of the substructure without external hardware;
   a first side portion and a second side portion connecting to a side of the substructure, the first side portion and the second side portion held in place by the bottom portion and the top portion; and
   a front panel, coupling to the front of the substructure via a series of security fasteners.

15. The booth of claim 14 wherein the booth is mounted on a wall.

16. The booth of claim 14 wherein the booth is mounted to a support structure away from a wall.

17. The booth of claim 15 wherein the first and second side sections are privacy panels extending out from the booth to prevent sound from leaving the booth.

18. The booth of claim 14 wherein two or more booths are connected together.

19. The booth of claim 14 wherein the substructure further includes a moveable vertical support that support a camera mount and a monitor mount.

20. The booth of claim 14 further comprising a transparent screen mounted at an angle to prevent a blow from damaging the transparent screen.

21. A video conference enclosure containing a monitor and a camera comprising:
   a top portion having an angled surface to prevent any liquid or solid materials from accumulating on the angled surface;
   a front portion including a transparent screen mount, the transparent screen mount having an angled surface to prevent any liquid or solid objects placed on the transparent screen mount from accumulating; and
   a transparent screen, mounted onto the transparent screen mount at an angle such that a blow to the screen has the force dissipated.

22. The enclosure of claim 21 where the transparent screen includes a scratch resistant panel placed in front of the transparent screen to prevent damage to the transparent screen.

23. The enclosure of claim 21 wherein the booth is mounted on a wall.

24. The enclosure of claim 21 wherein multiple booths are connected together to form a series of booths.

25. The enclosure of claims 21 wherein the booth is mounted on a pole.

* * * * *